United States Patent
Simcik et al.

(10) Patent No.: US 11,040,850 B2
(45) Date of Patent: Jun. 22, 2021

(54) SEAMLESS ELEVATOR CALL FROM MOBILE DEVICE APPLICATION

(71) Applicant: OTIS ELEVATOR COMPANY, Farmington, CT (US)

(72) Inventors: Paul A. Simcik, Southington, CT (US); Derk Oscar Pahlke, Berlin (DE); Markus Mueller, Berlin (DE); Stephen Richard Nichols, Plantsville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 609 days.

(21) Appl. No.: 15/936,801

(22) Filed: Mar. 27, 2018

(65) Prior Publication Data

US 2019/0300333 A1    Oct. 3, 2019

(51) Int. Cl.
*B66B 1/46* (2006.01)
*B66B 1/28* (2006.01)
(Continued)

(52) U.S. Cl.
CPC ............ *B66B 1/468* (2013.01); *B66B 1/28* (2013.01); *G01S 11/06* (2013.01); *B66B 2201/103* (2013.01); *B66B 2201/4615* (2013.01); *B66B 2201/4653* (2013.01); *H04W 4/80* (2018.02); *H04W 84/12* (2013.01)

(58) Field of Classification Search
CPC . B66B 1/468; B66B 1/2408; B66B 2201/103; B66B 2201/4615; B66B 1/28; B66B 2201/4653; G01S 11/06; H04W 4/80; H04W 4/12
See application file for complete search history.

(56) References Cited

U.S. PATENT DOCUMENTS

| 8,438,127 B2 | 5/2013 | Kurata et al. |
| 9,420,970 B2 | 8/2016 | Dagum |

(Continued)

FOREIGN PATENT DOCUMENTS

| CN | 105829223 A | 8/2016 |
| CN | 205527103 U | 8/2016 |

(Continued)

OTHER PUBLICATIONS

The Extended European Search Report for Application No. 19165640.4-3569544; Report dated Dec. 5, 2019; 6 pages.
(Continued)

*Primary Examiner* — Jeffrey Donels
(74) *Attorney, Agent, or Firm* — Cantor Colburn LLP

(57) ABSTRACT

A method of assigning a destination floor to an elevator call associated with a mobile device is provided. The method including: receiving a first elevator call to travel from a first floor, the first floor is a boarding floor for the first elevator call; detecting a location of a mobile device relative to an elevator car of an elevator system; moving the elevator car from the first floor to a second floor in response to the first elevator call; determining when the mobile device exits the elevator car at the second floor in response to the location of the mobile device, the second floor is a destination floor for the first elevator call; receiving a second elevator call from the mobile device; and establishing the second floor as a destination floor for the second elevator call.

16 Claims, 2 Drawing Sheets

Figure 1:
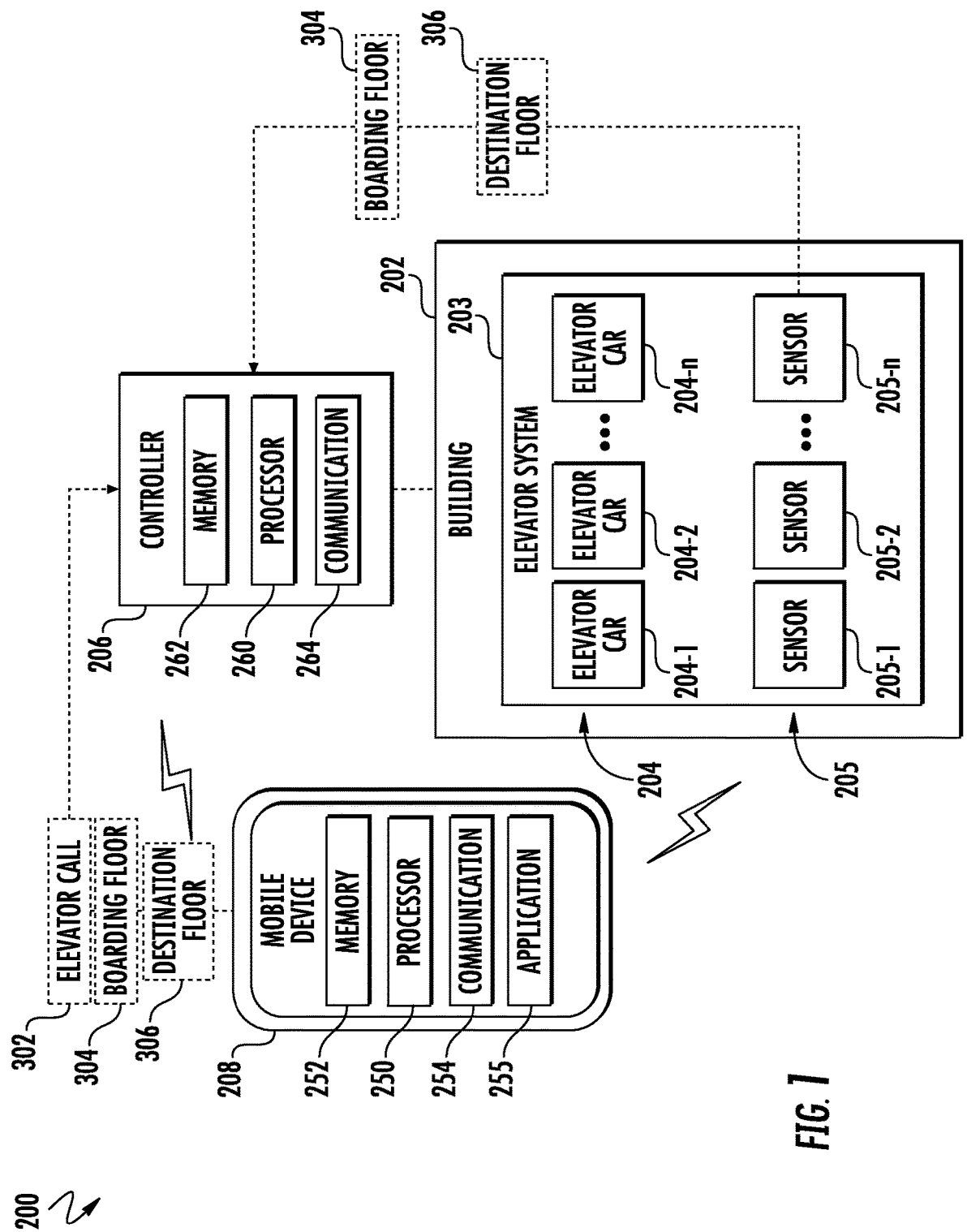

(51) Int. Cl.
*G01S 11/06* (2006.01)
*H04W 84/12* (2009.01)
*H04W 4/80* (2018.01)

(56) References Cited

U.S. PATENT DOCUMENTS

| | | | | |
|---|---|---|---|---|
| 9,469,502 | B2* | 10/2016 | Parkkinen | B66B 3/006 |
| 10,273,117 | B2* | 4/2019 | Buckman | B66B 1/468 |
| 10,450,163 | B2* | 10/2019 | Sha | B66B 3/00 |
| 10,597,255 | B2* | 3/2020 | Chapman | B66B 1/3461 |
| 10,640,329 | B2* | 5/2020 | Simcik | H04W 4/023 |
| 10,645,543 | B2* | 5/2020 | Chen | B66B 1/3461 |
| 10,647,545 | B2* | 5/2020 | Scoville | B66B 1/468 |
| 2004/0088107 | A1* | 5/2004 | Seligmann | G01C 21/36 |
| | | | | 709/224 |
| 2012/0138388 | A1* | 6/2012 | Finschi | B66B 1/2458 |
| | | | | 187/247 |
| 2015/0034426 | A1* | 2/2015 | Armistead | B66B 5/0037 |
| | | | | 187/392 |
| 2015/0158693 | A1 | 6/2015 | Talonen et al. | |
| 2015/0310139 | A1 | 10/2015 | Desikachari et al. | |
| 2016/0122157 | A1 | 5/2016 | Keser | |
| 2016/0207735 | A1* | 7/2016 | Elomaa | B66B 13/146 |
| 2016/0311647 | A1 | 10/2016 | Peterson et al. | |
| 2016/0325962 | A1* | 11/2016 | Blandin | B66B 1/468 |
| 2017/0291800 | A1* | 10/2017 | Scoville | H04W 76/10 |
| 2017/0300820 | A1 | 10/2017 | Raitola | |
| 2017/0369275 | A1 | 12/2017 | Saraswat et al. | |
| 2018/0099840 | A1* | 4/2018 | Armistead | B66B 3/008 |
| 2019/0161316 | A1* | 5/2019 | Nichols | B66B 1/2408 |
| 2019/0161317 | A1* | 5/2019 | Nichols | B66B 1/2408 |

FOREIGN PATENT DOCUMENTS

| | | |
|---|---|---|
| CN | 106315319 A | 1/2017 |
| CN | 106494953 A | 3/2017 |
| CN | 107207194 A | 9/2017 |
| CN | 105800401 B | 12/2017 |
| KR | 201700333091 A | 3/2017 |
| WO | 2017085352 A1 | 5/2017 |
| WO | 2017175019 A1 | 10/2017 |

OTHER PUBLICATIONS

First Chinese Office Action for Application No. 201910232699.7; dated Mar. 1, 2021; Report Received Date: Mar. 5, 2021; 10 pages.

* cited by examiner

SEAMLESS ELEVATOR CALL FROM MOBILE DEVICE APPLICATION

BACKGROUND

The subject matter disclosed herein generally relates to the field of elevator systems, and more particularly to an apparatus and method for determining a destination for a conveyance apparatus within a conveyance system.

Existing elevator systems allow a user to submit an elevator call (e.g., a hall call or a destination call) using their own mobile device (e.g., a smartphone). Current systems cannot determine whether the specific user who made the elevator call actually ends up boarding the elevator car and a destination for the user.

BRIEF SUMMARY

According to one embodiment a method of assigning a destination floor to an elevator call associated with a mobile device is provided. The method including: receiving a first elevator call to travel from a first floor, the first floor is a boarding floor for the first elevator call; detecting a location of a mobile device relative to an elevator car of an elevator system; moving the elevator car from the first floor to a second floor in response to the first elevator call; determining when the mobile device exits the elevator car at the second floor in response to the location of the mobile device, the second floor is a destination floor for the first elevator call; receiving a second elevator call from the mobile device; and establishing the second floor as a destination floor for the second elevator call.

In addition to one or more of the features described above, or as an alternative, further embodiments may include that the method further includes: moving the elevator car to the second floor.

In addition to one or more of the features described above, or as an alternative, further embodiments may include: moving the elevator car to the second floor when the mobile device is detected within the elevator car.

In addition to one or more of the features described above, or as an alternative, further embodiments may include that the first elevator call is received at a first time on a first day, and the second floor is established as the destination floor only if the second elevator call is received within a selected time period of the first time on a second day.

In addition to one or more of the features described above, or as an alternative, further embodiments may include that the second floor is established as the destination floor only if the first floor is a boarding floor for the second elevator call.

In addition to one or more of the features described above, or as an alternative, further embodiments may include that the second floor is established as the destination floor only if the first floor is a boarding floor for the second elevator call.

In addition to one or more of the features described above, or as an alternative, further embodiments may include that the mobile device transmits at least one of the first elevator call and the second call.

In addition to one or more of the features described above, or as an alternative, further embodiments may include that the detecting further includes: connecting to the mobile device using at least one of Wi-Fi and Bluetooth; and determining a distance between the elevator car and the mobile device.

In addition to one or more of the features described above, or as an alternative, further embodiments may include that the detecting further includes: detecting, a beacon transmitted by a sensor proximate the elevator car using the mobile device; and determining a distance between the elevator car and the mobile device in response to a strength of the beacon.

In addition to one or more of the features described above, or as an alternative, further embodiments may include that the detecting further includes: detecting, a beacon transmitted by the mobile device using a sensor proximate the elevator car; and determining a distance between the elevator car and the mobile device in response to a strength of the beacon.

In addition to one or more of the features described above, or as an alternative, further embodiments may include that the sensor does not connect to the wireless beacon.

According to another embodiment, an elevator system including: an elevator car; a controller in electronic communication with the elevator car, the controller configured to receive a first elevator call for a mobile device to travel from a first floor, the first floor is a boarding floor; and a sensor in electronic communication with the controller, the sensor in combination with the mobile device are configured to detect a location of the mobile device relative to an elevator car, the elevator car is configured to move the mobile device from the first floor to a second floor in response to the first elevator call, the second floor being a destination floor, and the controller is configured establish the second floor as a destination floor for a second elevator call.

In addition to one or more of the features described above, or as an alternative, further embodiments may include that the sensor uses at least one of Wi-Fi and Bluetooth to connect to the mobile device and determine a distance between the mobile device and the elevator car to determine a location of the mobile device relative to the elevator car.

In addition to one or more of the features described above, or as an alternative, further embodiments may include that the elevator car is moved to the second floor when the mobile device is detected within the elevator car.

In addition to one or more of the features described above, or as an alternative, further embodiments may include that the first elevator call is received at a first time on a first day, and that the second floor is established as the destination floor only if the second elevator call is received within a selected time period of the first time on a second day.

In addition to one or more of the features described above, or as an alternative, further embodiments may include that the second floor is established as the destination floor only if the first floor is a boarding floor for the second elevator call.

In addition to one or more of the features described above, or as an alternative, further embodiments may include that the second floor is established as the destination floor only if the first floor is a boarding floor for the second elevator call.

In addition to one or more of the features described above, or as an alternative, further embodiments may include that the mobile device transmits at least one of the first elevator call and the second call.

In addition to one or more of the features described above, or as an alternative, further embodiments may include that the sensor transmits a beacon; and the mobile device is configured to detect the beacon and determine a distance between the elevator car and the mobile device in response to a strength of the beacon.

According to an embodiment, a method of assigning a destination to a conveyance system call associated with a mobile device, the method including: receiving a first conveyance system call to travel from a first location, the first location is a boarding location for the first conveyance system call; detecting a location of a mobile device relative to a conveyance apparatus of a conveyance system; moving the conveyance apparatus from the first location to a second location in response to the first conveyance system call; determining when the mobile device exits the conveyance apparatus at the second location in response to the location of the mobile device, the second location is a destination location for the first conveyance system call; receiving a second conveyance system call from the mobile device; and establishing the second location as a destination location for the second conveyance system call.

Technical effects of embodiments of the present disclosure include the ability for an elevator control system to receive elevator destination calls from a mobile device, learns destination floors of the mobile device, and then predicts destination floors of the mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
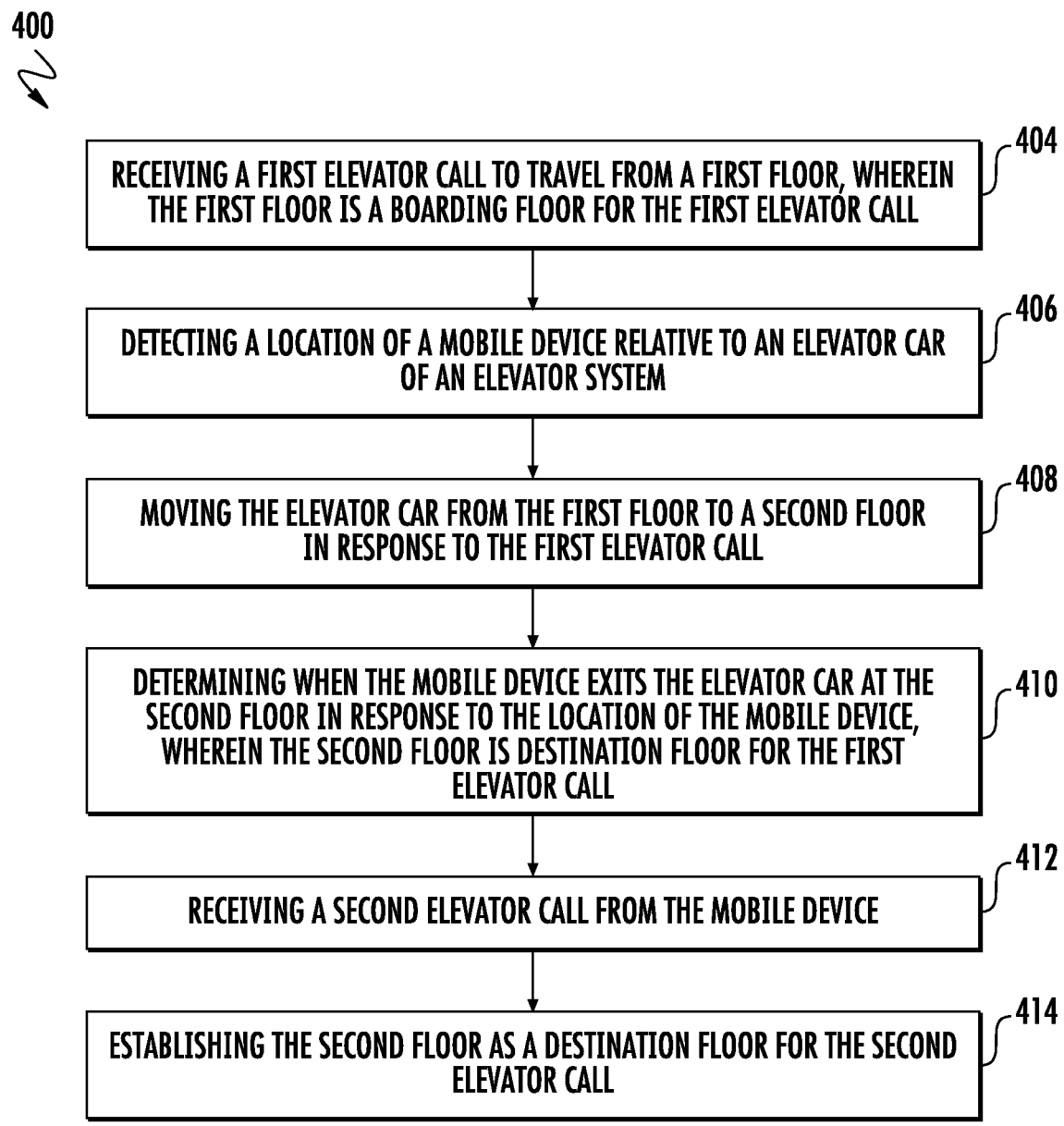

The following descriptions should not be considered limiting in any way. With reference to the accompanying drawings, like elements are numbered alike:

FIG. 1 illustrates a schematic view of an elevator call control system, in accordance with an embodiment of the disclosure; and FIG. 2 is a flow diagram illustrating a method of assigning a destination floor to an elevator call associated with a mobile device, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 depicts an elevator call control system 200 in an example embodiment. The elevator call control system 200 includes an elevator system 203 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance systems, such as the elevator system 203. It is understood that while an elevator system 204 is utilized for exemplary illustration, embodiments disclosed herein may be applied to other conveyance systems utilizing conveyance apparatuses for transportation such as, for example, escalators, automated car transportation, etc.

The elevator system 203 may be operably connected to one or more computing devices, such as a controller 206. The controller 206 may be configured to control dispatching operations for one or more elevator cars (e.g., elevator cars 204-1, 204-2, ... 204-n) associated with the elevator system 203. It is understood that the elevator system 203 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

Also shown in FIG. 1 is a mobile device 208. The mobile device 208 may be a mobile computing device that is typically carried by a person, such as, for example a smart phone, PDA, smart watch, tablet, laptop, etc. The mobile device 208 may include a touch screen (not shown). The mobile device 208 may include a processor 250, memory 252, and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein. The mobile device 208 may belong to a resident or employee of the building 202 who currently has access to the elevator system 203. Each mobile device 208 may transmit an elevator call 302 to the controller 206 through an application 255 installed on the mobile device 208 and the controller 206 will move an elevator car 204 in response to the elevator call 302. The elevator call 302 may include a boarding floor 304 and the destination floor 306 may be automatically determined by the elevator system 203. The boarding floor 304 is where the person with the mobile device 208 desires to board the elevator car 204 and the destination floor 306 is where the person with the mobile device 208 exits the elevator car 204. In one embodiment, the destination floor 306 and the boarding floor 304 may be automatically determined by the elevator system 203 using a sensor 205, as discuss further below. Embodiments herein generate a graphical user interface on the mobile device 208 through an application 255. A user of the mobile device 208 may transmit elevator calls 302 through the application 255 and may adjust the boarding floor 304 and/or the destination floor 306 through the application 255. In an embodiment, once the application 255 is installed on the mobile device 208, the application 208 may operate without any input from the user of the mobile device 208.

The mobile device 208 and the controller 206 communicate with one another. For example, the mobile device 208 and the controller 206 may communicate with one another when proximate to one another (e.g., within a threshold distance). The mobile device 208 and the controller 206 may communicate over a wireless network, such as 802.11x (Wi-Fi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the mobile device 208 using one or more communication protocols or standards. For example, the networked element may communicate with the mobile device 208 using near field communications (NFC). A connection between the mobile device 208 and the controller 206 may be direct or it may be through a web service. The connection also may include security elements such as VPN or authentication or encryption. In other embodiments, the controller 206 may establish connection with a mobile device 208 that is inside and/or outside of the building 202 in order to detect a location of the mobile device 208. A location of the mobile device 208 may be determined using various technologies including GPS, triangulation, trilateration, signal strength detection, accelerometer detection, gyroscopic detection, or barometric pressure sensing by way of non-limiting example. The triangulation and trilateration may use various wireless technologies including but not limited to Wi-Fi and Bluetooth. In example embodiments, the mobile device 208 communicates with the controller 206 over multiple independent wired and/or wireless networks. Embodiments are intended to cover a wide variety of types of communication between the mobile device 208 and controller 206, and embodiments are not limited to the examples provided in this disclosure. Communication between the mobile device 208 and the controller 206 through sensors 204 will allow the controller 206 to determine the location of the mobile device 208 in relation to the elevator system 203. The location of the mobile device 208 may be communicated to the controller 206 through a plurality of sensors 205, discussed further below.

The elevator system 203 includes one or more sensors 205 (e.g., 205-1, 205-2, . . . 205-n). The controller 206 is in electronic communication with each sensor 205 through a wired connection and/or wireless connection. In an alternative embodiment, each sensor 205 may be in indirect communication with the controller 206 through the mobile device 208. In a non-limiting example, the sensors 205 are a wireless signal beacon (e.g., Bluetooth), that the mobile device 208 can detect when it is in proximity of the sensor 205, then the mobile device 208 can communicate with the controller 206 that it is in the elevator car 204. In a non-limiting example, the sensors 205 are a wireless signal transceiver (e.g., Bluetooth) that are configured to detect a wireless signal beacon (e.g., Bluetooth) transmitted through the communication device 254 on the mobile device 208 when the mobile device 208 is in proximity of the sensor 205. Although two sensors 205-1 and 205-2 are shown in FIG. 1, it is understood that any number of sensors 205-n may be used in the elevator system 203.

Each sensor 205 is configured to detect a location of the mobile device 208 to determine the boarding floor 304 and the destination floor 306 of a mobile device 208. The detected boarding floor 304 and destination floor 306 are transmitted to the controller 206. The sensors 204 may be located in an elevator car 204 and/or proximate an elevator bank when one may enter an elevator car 204. It is understood that each elevator car 204 may contain one or more sensors 205. Each sensor 205 or an additional sensor (not shown) may be configured to detect operational data of the elevator car 204, such as for example, elevator door position (e.g., open/closed), elevator car location, speed, voltage, vibration, acceleration, noise, deceleration, jerk, and any other performance parameter of any component of the elevator system 204 known to one of skill in the art.

The sensors 205 detect the location of an individual relative to an elevator car 204 and identify the individual using various sensing technology, such as, for example Wi-Fi transceivers, Bluetooth transceivers, radio transceivers, visual recognition cameras, people counters, microphones, etc. The sensors 205 detect persons and/or mobile devices 208 entering and leaving the elevator car 204. The type and nature of sensors 205 within the sensor system 203 is not limited to the embodiments disclosed herein. The mobile device 208 and the sensors 205 communicate with one another. For example, the mobile device 208 and the sensors 205 may communicate with one another when proximate to one another (e.g., within a threshold distance). The mobile device 208 and the sensors 205 may communicate over a wireless network, such as 802.11x (Wi-Fi), ZigBee, Z-Wave and short-range radio (Bluetooth).

In an embodiment, the sensors 205 may include a Wi-Fi transceiver to connect to a mobile device 208 when the mobile device 208 enters/exits the elevator car 204 in order to identify/locate the mobile device 208. In another embodiment, the sensors 205 may include a Bluetooth transceiver to connect to a mobile device 208 when the mobile devices 208 enters/exits the elevator car 204 in order to identify/locate the mobile device 208. The sensors 205 are configured to detect a distance between the elevator car 204 and the mobile device 208 and monitor the distance for a selected period of time to determine whether the mobile device 208 is entering and/or leaving the elevator car 204.

Communication between the mobile device 208 and the sensors 205 can be one-way or two-way communication. In one example, if Bluetooth is utilized then the mobile device 208 may advertise a Bluetooth signal (i.e., beacon) and the sensors 205 may receive it. In another example, the sensors 205 may advertise a Bluetooth signal and the mobile device 208 may receive it. In another example, there may be two-way Bluetooth communication between the sensors 205 and the mobile device 208. In another example, a Wi-Fi transceiver (i.e., sensor 205) may be placed in an elevator car and the mobile device may detect the Wi-Fi beacon frame as part of the 802.11x protocol as well as the received signal strength of that beacon frame to approximate the distance between the Wi-Fi transceiver and the mobile device 208 but not connect to the Wi-Fi signal. In another example, the mobile device 208 may actively send a probe request looking for Wi-Fi transceivers, then a Wi-Fi transceiver (i.e., sensor 205) located in an elevator car may extract the MAC address of the mobile device 208 from the probe request and approximate distance between the Wi-Fi transceiver and the mobile device 208 from received signal strength.

In another embodiment, the sensors 205 may include a visual recognition camera to detect each person entering and leaving an elevator car and map connect the person with their mobile device 208. Advantageously, knowing the identity of the person carrying the mobile device 208 helps determine if the mobile device 208 has placed an elevator call 302 and the destination floor 306 of the mobile device 208.

Referring now to FIG. 2 with continued reference to FIG. 1. FIG. 2 shows a flow chart of method 400 assigning a destination floor 306 to an elevator call associated with a mobile device 208, in accordance with an embodiment of the disclosure. At block 404, a first elevator call 302 to travel from a first floor is received. The first floor is a boarding floor 304 for the first elevator call 302. The elevator call 302 may be placed in multiple ways including but not limited to: manually by a person using the application 255 on the mobile device 208, automatically by the application 255 on the mobile device 208, or manually by a person carrying the mobile device 208 pressing an elevator call button proximate an elevator bank.

At block 406, a location of a mobile device 208 is detected relative to an elevator car 204 of an elevator system 203. As mentioned above, a sensor 205 may detect the location of the mobile device 208 relative to the elevator car 204 by connecting to the mobile device 208 through at least one of Wi-Fi and Bluetooth and determining a distance between the elevator car 204 and the mobile device 208. The sensor 205 may detect the location of the mobile device 208 by detecting a wireless signal of the mobile device 208 while not connecting to the mobile device 208 and determining a distance between the elevator car 204 and the mobile device 208. In an embodiment, the wireless signal may be Bluetooth. The location of each sensor 205 relative to the elevator car 204 is known, thus by detecting the signal (ex: Wi-Fi and Bluetooth) strength between the sensor 205 and the mobile device 208, the controller 206 may then determine the distance between the elevator car 204 and the mobile device 208.

At block 408, the elevator car 204 is moved from the first floor to a second floor in response to the first elevator call 302. At block 410, it is determined when the mobile device 208 exits elevator car 204 at the second floor in response to the location of the mobile device 208. The second floor is the destination floor 306. At block 412, a second elevator call from the mobile device 208 is received.

At block 414, the second floor is established as a destination floor 306 for the second elevator call 302 in the controller 208. Thus, the controller 206 may now automatically assume that any time a person carrying the mobile device 208 calls an elevator they want to head to the second floor. That assumption may be based upon the several variables including but not limited to the time of the day and the boarding floor. In one non-limiting example, the controller 206 established the destination floor 306 from the first elevator call as the destination floor 306 for any subsequent elevator call received from the mobile device 302. The controller 206 may only establish the second floor as destination floor 306 for any subsequent elevator call received from the mobile device 302 at around the same time. In an embodiment, if the first elevator call 302 is received at a first time on a first day then the second floor is established as the destination floor only if the second elevator call 302 is received within a selected time period of the first time on a second day. For example, if the first elevator call 302 is received at 8:00 am on a first day then the second floor is established as the destination floor only if the second elevator call 302 is received within a selected time period of 8:00 am on a second day In another embodiment, the second floor is established as the destination floor 306 only if the first floor is a boarding floor for the second elevator call. For example, the controller 206 will learn that the a person carrying the mobile device always heads to the second floor every time they board the elevator car 204 at the first floor. The controller 206 may establish learned behavior after a single elevator call or multiple elevator 208 calls over a period of time. The learned behavior may be based on a percentage of likelihood. For example, about ninety percent of the time a person carrying the mobile device heads to the second floor when they enter the elevator car 204 at the first floor.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assigning a destination floor to an elevator call associated with a mobile device, the method comprising:

receiving a first elevator call to travel from a first location, wherein the first location is a boarding floor for the first elevator call;
detecting a location of a mobile device relative to an elevator car of an elevator system;
moving the elevator car from the first location to a second location in response to the first elevator call;
determining when the mobile device exits the elevator car at the second location in response to the location of the mobile device, wherein the second location is a destination floor for the first elevator call;
receiving a second elevator call from the mobile device; and
establishing the second location as a destination floor for the second elevator call,
wherein the second location is established as the destination floor only if the first location is a boarding floor for the second elevator call.

2. The method of claim 1, wherein the method further comprises:
moving the elevator car to the second location.

3. The method of claim 1, further comprising:
moving the elevator car to the second location when the mobile device is detected within the elevator car.

4. The method of claim 1, wherein:
the first elevator call is received at a first time on a first day, and
wherein the second location is established as the destination floor only if the second elevator call is received within a selected time period of the first time on a second day.

5. The method of claim 1, wherein:
the mobile device transmits at least one of the first elevator call and the second call.

6. The method of claim 1, wherein the detecting further comprises:
connecting to the mobile device using at least one of Wi-Fi and Bluetooth; and
determining a distance between the elevator car and the mobile device.

7. The method of claim 1, wherein the detecting further comprises:
detecting, a beacon transmitted by a sensor proximate the elevator car using the mobile device; and
determining a distance between the elevator car and the mobile device in response to a strength of the beacon.

8. The method of claim 1, wherein the detecting further comprises:
detecting, a beacon transmitted by the mobile device using a sensor proximate the elevator car; and
determining a distance between the elevator car and the mobile device in response to a strength of the beacon.

9. The method of claim 8, wherein:
the sensor does not connect to the wireless beacon.

10. An elevator system comprising:
an elevator car;
a controller in electronic communication with the elevator car, the controller configured to receive a first elevator call for a mobile device to travel from a first location, wherein the first location is a boarding floor; and
a sensor in electronic communication with the controller, the sensor in combination with the mobile device are configured to detect a location of the mobile device relative to an elevator car,
wherein the elevator car is configured to move the mobile device from the first location to a second location in response to the first elevator call, the second location being a destination floor,
wherein the controller is configured establish the second location as a destination floor for a second elevator call, and
wherein the second location is established as the destination floor only if the first location is the boarding floor for the second elevator call.

11. The elevator system of claim 10, wherein:
the sensor uses at least one of Wi-Fi and Bluetooth to connect to the mobile device and determine a distance between the mobile device and the elevator car to determine a location of the mobile device relative to the elevator car.

12. The elevator system of claim 10, wherein:
the elevator car is moved to the second location when the mobile device is detected within the elevator car.

13. The elevator system of claim 10, wherein:
the first elevator call is received at a first time on a first day, and
wherein the second location is established as the destination floor only if the second elevator call is received within a selected time period of the first time on a second day.

14. The elevator system of claim 10, wherein:
the mobile device transmits at least one of the first elevator call and the second call.

15. The elevator system of claim 10, wherein:
the sensor transmits a beacon; and
the mobile device is configured to detect the beacon and determine a distance between the elevator car and the mobile device in response to a strength of the beacon.

16. A method of assigning a destination to a conveyance system call associated with a mobile device, the method comprising:
receiving a first conveyance system call to travel from a first location, wherein the first location is a boarding location for the first conveyance system call;
detecting a location of a mobile device relative to a conveyance apparatus of a conveyance system;
moving the conveyance apparatus from the first location to a second location in response to the first conveyance system call;
determining when the mobile device exits the conveyance apparatus at the second location in response to the location of the mobile device, wherein the second location is a destination location for the first conveyance system call;
receiving a second conveyance system call from the mobile device; and
establishing the second location as a destination location for the second conveyance system call,
wherein the second location is established as the destination location only if the first location is the boarding location for the second elevator call.

* * * * *